Figure 1:
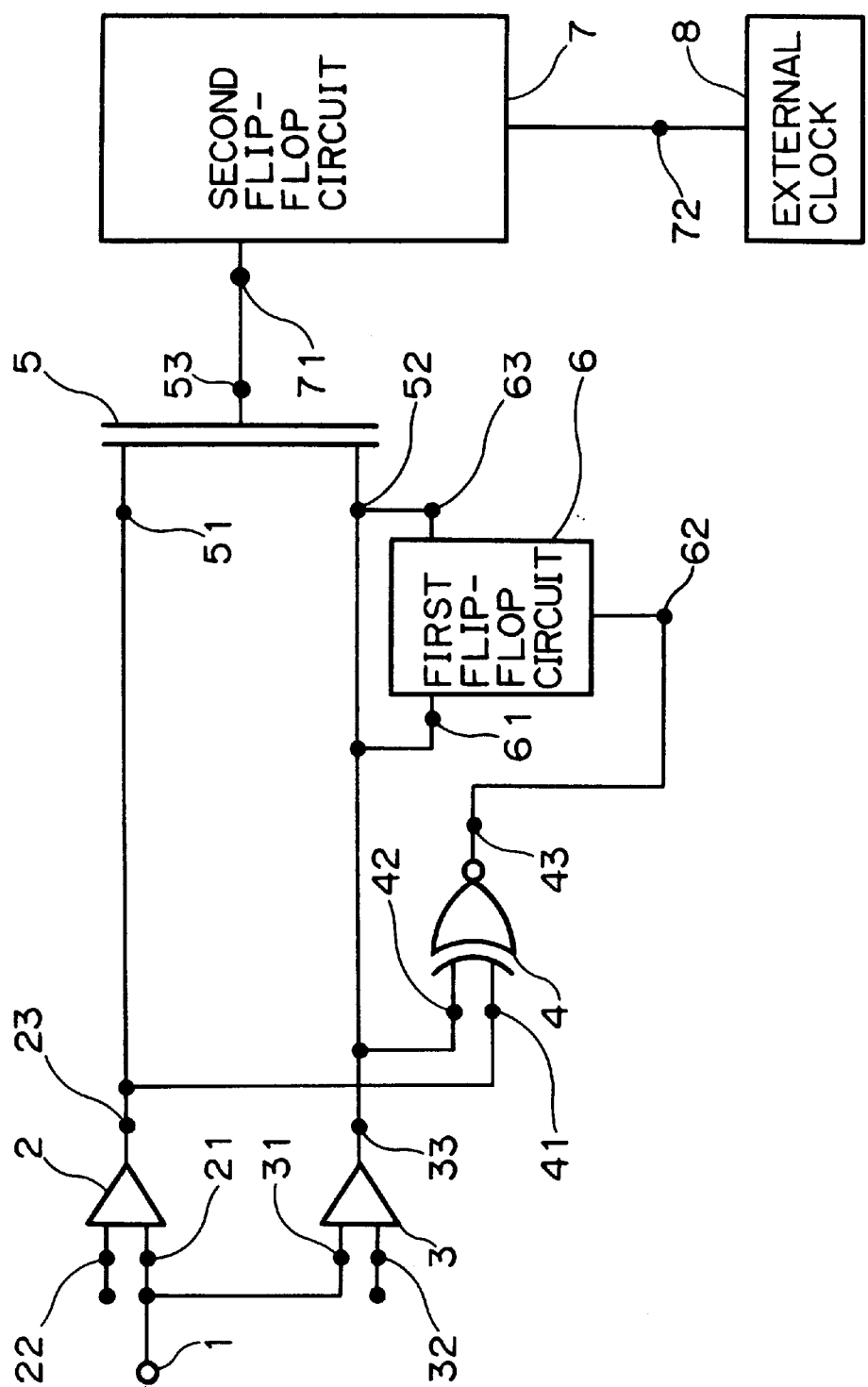

United States Patent [19]
Kamiya

[11] Patent Number: 5,933,799
[45] Date of Patent: Aug. 3, 1999

[54] NOISE ELIMINATING BUS RECEIVER

[75] Inventor: Hiroshi Kamiya, Tokyo, Japan

[73] Assignee: NEC Corporation, Tokyo, Japan

[21] Appl. No.: 08/932,060

[22] Filed: Sep. 17, 1997

[30] Foreign Application Priority Data

Sep. 18, 1996 [JP] Japan ................................. 8-246029

[51] Int. Cl.⁶ ............................................. H03K 19/0185
[52] U.S. Cl. ............................ 702/191; 326/86; 326/21
[58] Field of Search ................................. 326/86, 39, 21, 326/30; 327/281, 333; 702/191, 195

[56] References Cited

U.S. PATENT DOCUMENTS

| 5,646,553 | 7/1997 | Mitchell et al. | 326/86 |
| 5,729,152 | 3/1998 | Leung et al. | 326/21 |
| 5,818,261 | 11/1998 | Perner | 326/86 |

FOREIGN PATENT DOCUMENTS

| 63-152214 | 6/1988 | Japan . |
| 63-223814 | 9/1988 | Japan . |

*Primary Examiner*—Kamini Shah
*Attorney, Agent, or Firm*—Sughrue, Mion, Zinn, Macpeak & Seas, PLLC

[57] ABSTRACT

There is provided a bus receiver including a first differential amplifier comparing an input signal to a first reference voltage, and transmitting a first pulse signal accordingly, a second differential amplifier comparing the input signal to a second reference voltage, and transmitting a second pulse signal accordingly, an exclusive OR circuit transmitting an exclusive OR pulse signal indicative of exclusive OR of the first and second pulse signals, a first flip-flop circuit receiving the exclusive OR pulse signal as clock, and receiving the second pulse signal as data, and a selector selecting one of the first and second pulse signals in accordance with an output of the first flip-flop circuit. The bus receiver readily eliminates noises. The bus receiver may further include a second flip-flop circuit receiving external clock as clock, and receiving an output of the selector as data. The provision of the second flip-flop circuit ensures that the bus receiver can be readily synchronized with other circuits electrically connected to the bus receiver and designed to operate under the same external clocks as those for the bus receiver.

4 Claims, 5 Drawing Sheets

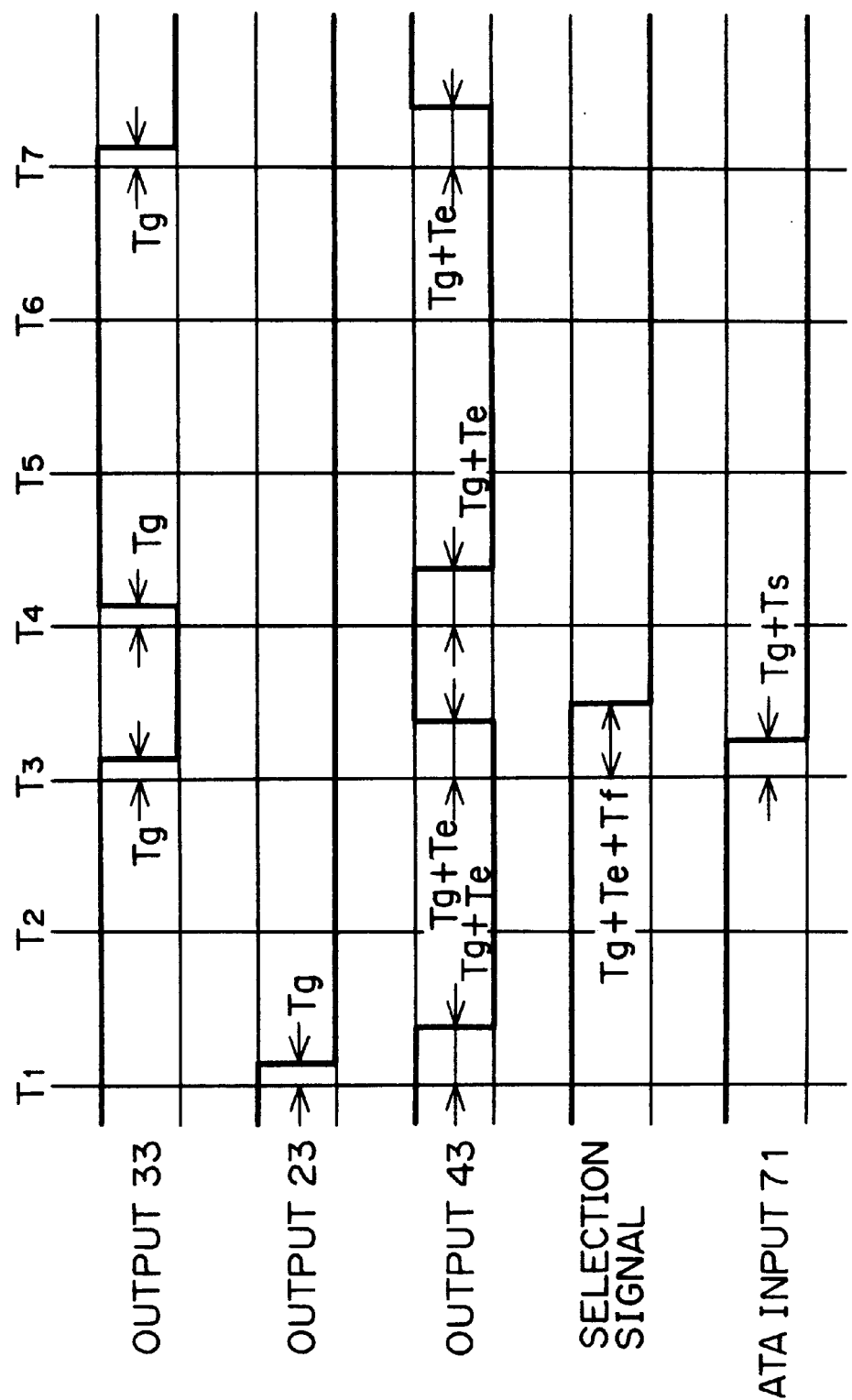

NOISE ELIMINATING BUS RECEIVER

BACKGROUND OF THE INVENTION

1. Field of the Invention

The invention relates to a bus receiver, and more particularly to a bus receiver having a function of eliminating noises.

2. Description of the Related Art

As an example of a conventional bus receiver having a function of eliminating noises, Japanese Unexamined Patent Publication No. 63-152214 has suggested one. In the suggested bus receiver, logical sum of first and last transitions of an input signal is received in a counter designed to operate by clocks transmitted from a clock transmitter. Then, an output of the counter is transmitted to a clock terminal of a flip-flop circuit, and the input signal is transmitted to a data terminal of the flip-flop circuit. Thus, noises are eliminated from the input signal.

However, the bus receiver suggested in the above-mentioned Publication has a problem that it would be quite difficult to synchronize the bus receiver in clock with other circuits transmitting signals to and receiving signals from the bus receiver.

Japanese Unexamined Patent Publication No. 63-223814 has suggested a bus in which a connector for electrically connecting a board to a bus line is electrically connected to the bus line through a bus driver, a bus receiver or a bus transceiver.

SUMMARY OF THE INVENTION

In view of the above-mentioned problem of the conventional bus receiver, it is an object of the present invention to provide a bus receiver capable of readily making synchronization in clock with other circuits as well as eliminating noises. It is also an object of the present invention to provide a method of doing the same.

In one aspect, there is provided a bus receiver including (a) a first differential amplifier comparing an input signal to a first reference voltage, and transmitting a first pulse signal accordingly, (b) a second differential amplifier comparing the input signal to a second reference voltage, and transmitting a second pulse signal accordingly, an exclusive OR circuit transmitting an exclusive OR pulse signal indicative of exclusive OR of the first and second pulse signals, a first flip-flop circuit receiving the exclusive OR pulse signal as clock, and receiving the second pulse signal as data, and a selector selecting one of the first and second pulse signals in accordance with an output of the first flip-flop circuit.

In accordance with the above-mentioned bus receiver, it is ensured that noises are readily eliminated.

There is further provided a bus receiver including a first differential amplifier comparing an input signal to a first reference voltage, and transmitting a first pulse signal accordingly, a second differential amplifier comparing the input signal to a second reference voltage, and transmitting a second pulse signal accordingly, an exclusive OR circuit transmitting an exclusive OR pulse signal indicative of exclusive OR of the first and second pulse signals, a first flip-flop circuit receiving the exclusive OR pulse signal as clock, and receiving the second pulse signal as data, a selector selecting one of the first and second pulse signals in accordance with an output of the first flip-flop circuit, and a second flip-flop circuit receiving external clock as clock, and receiving an output of the selector as data.

The provision of the second flip-flop circuit ensures that the bus receiver can be readily synchronized with other circuits electrically connected to the bus receiver and designed to operate under the same external clocks as those or the bus receiver.

In another aspect, there is provided a method of eliminating noise from signals, including the steps of (a) comparing an input to a first reference voltage to thereby obtain a first difference therebetween, (b) comparing the input to a second reference voltage to thereby obtain a second difference therebetween, (c) calculating exclusive OR of the first and second differences, (d) carrying out flip-flop operation between the exclusive OR and the second difference, and (e) selecting one of the first and second differences in accordance with a result of the step (d).

There is further provided a method of eliminating noise from signals, including the steps of (a) comparing an input to a first reference voltage to thereby obtain a first difference therebetween, (b) comparing the input to a second reference voltage to thereby obtain a second difference therebetween, (c) calculating exclusive OR of the first and second differences, (d) carrying out flip-flop operation between the exclusive OR and the second difference, (e) selecting one of the first and second differences in accordance with a result of the step (d), and (f) carrying out second flip-flop operation between external clock and a difference selected in the step (e) between the first and second differences.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 1 is a block diagram of a bus receiver in accordance with the referred embodiment of the present invention.

FIG. 2 is a time chart of input waveform.

FIG. 3 is a time chart showing how the bus receiver illustrated in FIG. 1 operates in response to the input waveform illustrated in FIG. 2.

FIG. 4 is a time chart of another input waveform.

FIG. 5 is a time chart showing how the bus receiver illustrated in FIG. 1 operates in response to the input waveform illustrated in FIG. 4.

DESCRIPTION OF THE PREFERRED EMBODIMENT

A bus receiver in accordance with the preferred embodiment is explained hereinbelow with reference to FIG. 1. An input signal terminal 1 is electrically connected to both a first input 21 of a first differential amplifier circuit 2 and a first input 31 of a second differential amplifier circuit 3. Input signals are transmitted to both the first and second differential amplifier circuits 2 and 3 through the input signal terminal 1. A first reference voltage is introduced into a second input 22 of the first differential circuit 2, and a second differential voltage is introduced into a second input 32 of the second differential amplifier circuit 3.

An output 23 of the first differential amplifier circuit 2 is electrically connected to both a first input 41 of an exclusive OR circuit 4 and a first terminal 51 of a selector 5, and an output 33 of the second differential amplifier circuit 3 is electrically connected to a second input 42 of the exclusive OR circuit 4, a second terminal 52 of the selector 5, and a data input 61 of a first flip-flop circuit 6. An output 43 of the exclusive OR circuit 4 is electrically connected to a clock input 62 of the first flip-flop circuit 6. An output 63 of the first flip-flop circuit 6 is electrically connected to the second terminal 52 of the selector 5. Output signals transmitted from the first flip-flop circuit 6 are introduced into the selector 5 through the second terminal 52 as selection signals.

A third terminal 53 of the selector 5 is electrically connected to a data input 71 of a second flip-flop circuit 7. External clock 8 is input to a clock input 72 of the second flip-flop circuit 7.

Figure 4:
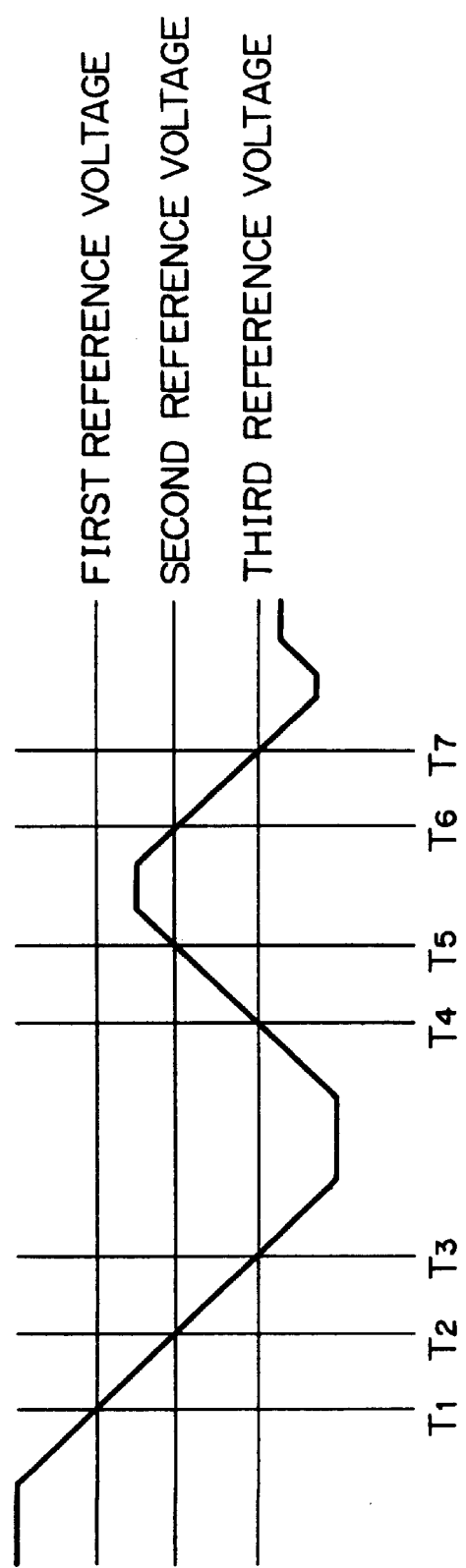

Hereinbelow is explained the operation of the bus receiver illustrated in FIG. 1. Hereinbelow is explained how the bus receiver operates when it receives voltage having the waveform as illustrated in FIG. 2 and a voltage having the waveform as illustrated in FIG. 4, respectively.

Figure 2:
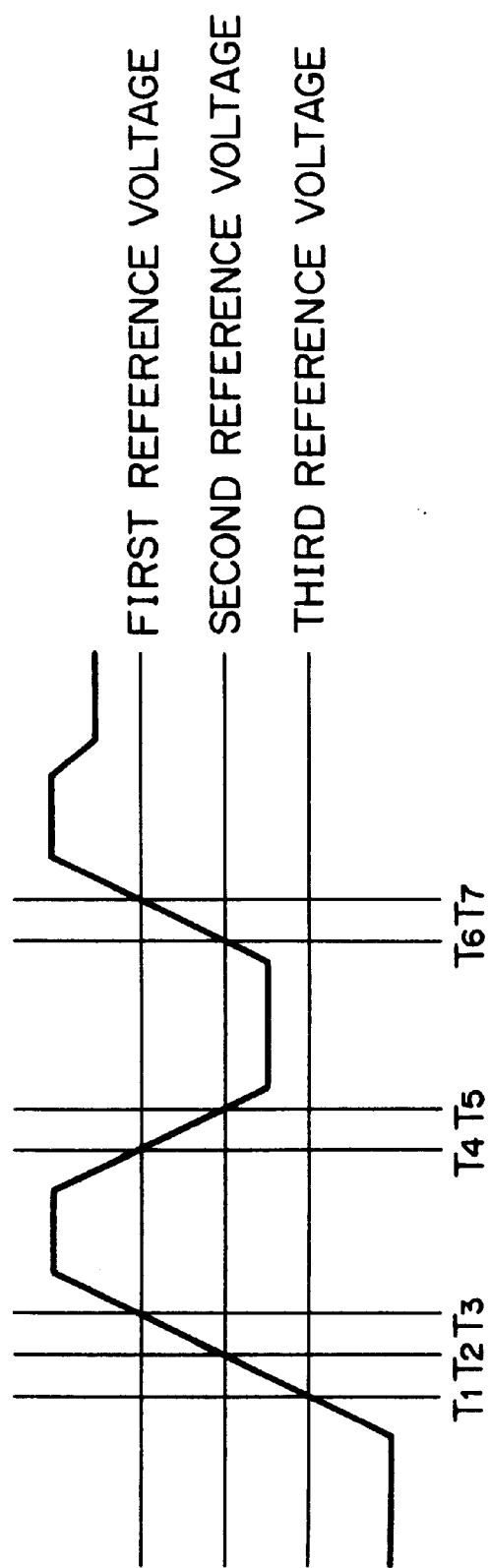

First, it is assumed that a voltage having the waveform illustrated in FIG. 2, which includes noises, is input to the input signal terminal 1. In the description hereinbelow, a first reference voltage is higher than a third reference voltage, which is in turn higher than a second reference voltage. Herein, the third reference voltage is equal to a threshold voltage of the second flip-flop circuit 7. In the waveform illustrated in FIG. 2, the voltage is first kept to be a voltage lower than the second reference voltage, but commences to rise up. The voltage reaches the second reference voltage at time $T_1$, and continues to rise up. Then, the voltage reaches the third reference voltage at time $T_2$, and the first reference voltage at time $T_3$.

When the voltage reaches a maximum voltage, the voltage is kept constant for some time, and then commences to drop off. The voltage reaches the first reference voltage at time $T_4$, and the third reference voltage at time $T_5$. Then, the voltage is kept constant at a voltage lower than the third reference voltage, but higher than the second reference voltage. Some time later, the voltage commences to rise up again. The voltage reaches the third reference voltage at time $T_6$, and the first reference voltage at time $T_7$. Hereafter, the voltage reaches its maximum.

As is clear in FIG. 2, there takes place ringing between time $T_5$ and $T_6$. Hence, the ring-back voltage is kept below the third reference voltage between time $T_5$ and $T_6$.

Figure 3:
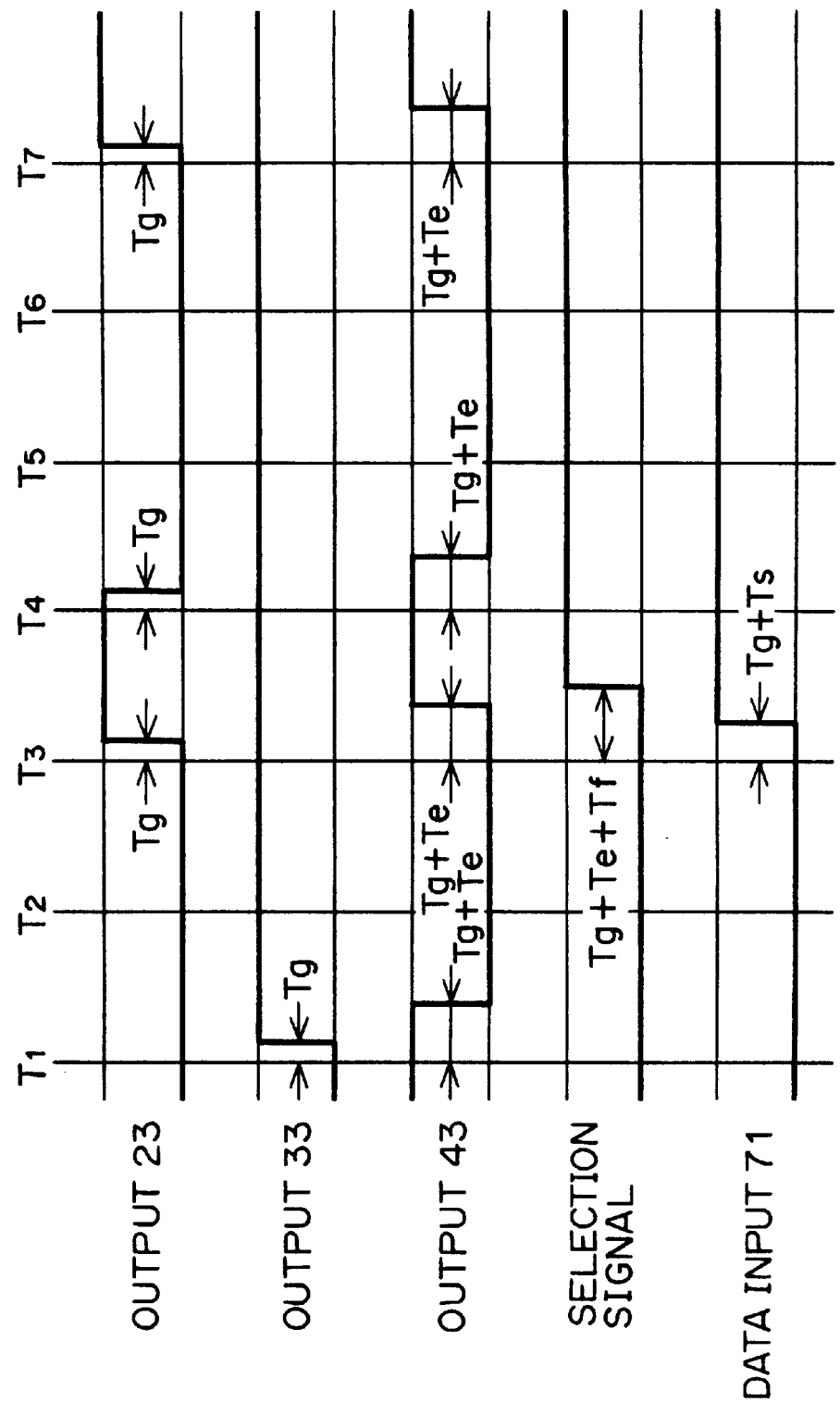

FIG. 3 illustrates how the bus receiver operates on receiving the voltage having the waveform illustrated in FIG. 2. Namely, FIG. 3 illustrates the waveforms which the output 23 of the first differential amplifier circuit 2, the output 33 of the second differential amplifier circuit 3, the output 43 of the exclusive OR circuit 4, the selection signal of the selector 5, and the data input 71 of the second flip-flop circuit 7 have at time $T_1$, to $T_7$. Herein, Tg indicates a gate delay time of the first and second differential amplifier circuits 2 and 3, Te indicates a gate delay time of the exclusive OR circuit 4, Tf indicates a gate delay time of the first flip-flop circuit 6, and Ts indicates a gate delay time of the selector 5.

As illustrated in FIG. 3, the output 23 of the first differential amplifier circuit 2 is at low level at time $T_1$, and kept at low level until ($T_3$+Tg) and at high level between ($T_3$+Tg) and ($T_4$+Tg). Hereafter, the output 23 is kept at low level between ($T_4$+Tg) and ($T_7$+Tg), and then kept at high level from ($T_7$+Tg). That is, the output 23 has a cycle where it is kept at high level for one interval and low level for three intervals. This cycle is repeated.

The output 33 of the second differential amplifier circuit 3 is at low level at time $T_1$, and kept at low level until ($T_1$+Tg), but is kept at high level later than ($T_1$+Tg).

The output 43 of the exclusive OR circuit 4 is kept at high level at time $T_1$, and kept at high level until ($T_1$+Tg+Te). The output 43 is kept at low level between ($T_1$+Tg+Te) and ($T_3$+Tg+Te), at high level between ($T_3$+Tg+Te) and ($T_4$+Tg+Te), at low level between ($T_4$+Tg+Te) and ($T_7$+Tg+Te), and at high level later than ($T_7$+Tg+Te).

The selection signal of the selector 5 is at low level at time $T_1$, and is kept at low level until ($T_3$+Tg+Te+Tf). Later than ($T_3$+Tg+Te +Tf), the selection signal of the selector 5 is kept at high level.

The data input 71 of the second flip-flop circuit 7 is at low level at time $T_1$, and is kept at low level until ($T_3$+Tg+Ts). Hereafter, the data input 71 is kept at high level later than ($T_3$+Tg+Ts).

In the bus receiver illustrated in FIG. 1, the first terminal 51 of the selector 5 is kept effective while the selection signal of the selector 5 is kept at low level, whereas the second terminal 52 of the selector 5 is kept effective while the selection signal of the selector 5 is kept at high level. As is obvious in view of FIG. 3, even if the external clock is introduced into the second flip-flop circuit 7 through the clock input 72 between ($T_5$+Tg) and ($T_6$+Tg), the second flip-flop circuit 7 receives the selection signal at high level. Thus, there does not occur malfunction in the second flip-flop circuit 7.

Second, it is assumed that a voltage having the waveform illustrated in FIG. 4, which includes noises, is input to the input signal terminal 1. In the waveform illustrated in FIG. 4, the voltage is first kept to be a maximum voltage higher than the first reference voltage, but commences to drop off. The voltage reaches the first reference voltage at time $T_1$, and continues to drop off. Then, the voltage reaches the third reference voltage at time $T_2$, and the second reference voltage at time $T_3$.

When the voltage reaches a minimum voltage, the voltage is kept constant for some time between time $T_3$ and $T_4$, and then commences to rise up. The voltage reaches the second reference voltage at time $T_4$, and the third reference voltage at time $T_5$. Then, the voltage is kept constant at a voltage higher than the third reference voltage, but lower than the first reference voltage. Some time later, the voltage commences to drop off again. The voltage reaches the third reference voltage at time $T_6$, and the second reference voltage at time $T_7$. Hereafter, the voltage reaches its maximum.

As is clear in FIG. 4, there takes place ringing between time $T_5$ and $T_6$. Hence, the ring-back voltage is kept above the third reference voltage between time $T_5$ and $T_6$.

FIG. 5 illustrates how the bus receiver operates on receiving the voltage having the waveform illustrated in FIG. 4. Namely, FIG. 5 illustrates the waveforms which the output 33 of the second differential amplifier circuit 3, the output 23 of the first differential amplifier circuit 2, the output 43 of the exclusive OR circuit 4, the selection signal of the selector 5, and the data input 71 of the second flip-flop circuit 7 have at time $T_1$ to $T_7$.

As illustrated in FIG. 5, the output 33 of the second differential amplifier circuit 3 is at high level at time $T_1$, and kept at high level until ($T_3$+Tg) and at low level between ($T_3$+Tg) and ($T_4$+Tg). Hereafter, the output 33 is kept at high level between ($T_4$+Tg) and ($T_7$+Tg), and then kept at low level from ($T_7$+Tg). That is, the output 33 has a cycle where it is kept at high level for three intervals and low level for one interval. This cycle is repeated.

The output 23 of the first differential amplifier circuit 2 is at high level at time $T_1$, and kept at high level until ($T_1$+Tg), but is kept at low level later than ($T_1$+Tg).

The output 43 of the exclusive OR circuit 4 is kept at high level at time $T_1$, and kept at high level until ($T_1$+Tg+Te). The output 43 is kept at low level between ($T_1$+Tg+Te) and ($T_3$+Tg+Te), at high level between ($T_3$+Tg+Te) and ($T_4$+Tg+Te), at low level between ($T_4$+Tg+Te) and ($T_7$+Tg+Te), and at high level later than ($T_7$+Tg+Te).

The selection signal of the selector 5 is at high level at time $T_1$, and is kept at high level until ($T_3$+Tg+Te+Tf). Later than ($T_3$+Tg+Te+Tf), the selection signal of the selector 5 is kept at low level.

The data input 71 of the second flip-flop circuit 7 is at high level at time $T_1$, and is kept at high level until ($T_3$+Tg+Ts). Hereafter, the data input 71 is kept at low level later than ($T_3$+Tg+Ts).

As is obvious in view of FIG. 5, even if the external clock is introduced into the second flip-flop circuit 7 through the clock input 72 between ($T_5$+Tg) and ($T_6$+Tg), the second flip-flop circuit 7 receives the selection signal at low level. Thus, there does not occur malfunction in the second flip-flop circuit 7.

In addition, since the external clock is directly input into the second flip-flop circuit 7 through the clock terminal 72, it is ensured that the bus receiver can be readily synchronized with other circuits electrically connected to the bus receiver and designed to operate under the same external clocks as those for the bus receiver.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 8-246029 filed on Sep. 18, 1996 including specification, claims, drawings and summary is incorporated herein by reference in its entirety.

What is claimed is:

1. A bus receiver comprising:
   (a) a first differential amplifier comparing an input signal to a first reference voltage, and transmitting a first pulse signal accordingly;
   (b) a second differential amplifier comparing said input signal to a second reference voltage, and transmitting a second pulse signal accordingly;
   (c) an exclusive OR circuit transmitting an exclusive OR pulse signal indicative of exclusive OR of said first and second pulse signals;
   (d) a first flip-flop circuit receiving said exclusive OR pulse signal as clock, and receiving said second pulse signal as data; and
   (e) a selector selecting one of said first and second pulse signals in accordance with an output of said first flip-flop circuit.

2. A bus receiver comprising:
   (a) a first differential amplifier comparing an input signal to a first reference voltage, and transmitting a first pulse signal accordingly;
   (b) a second differential amplifier comparing said input signal to a second reference voltage, and transmitting a second pulse signal accordingly;
   (c) an exclusive OR circuit transmitting an exclusive OR pulse signal indicative of exclusive OR of said first and second pulse signals;
   (d) a first flip-flop circuit receiving said exclusive OR pulse signal as clock, and receiving said second pulse signal as data;
   (e) a selector selecting one of said first and second pulse signals in accordance with an output of said first flip-flop circuit; and
   (f) a second flip-flop circuit receiving external clock as clock, and receiving an output of said selector as data.

3. A method of eliminating noise from signals, comprising the steps of:
   (a) comparing an input to a first reference voltage to thereby obtain a first difference therebetween;
   (b) comparing said input to a second reference voltage to thereby obtain a second difference therebetween;
   (c) calculating exclusive OR of said first and second differences;
   (d) carrying out flip-flop operation between said exclusive OR and said second difference; and
   (e) selecting one of said first and second differences in accordance with a result of said step (d).

4. A method of eliminating noise from signals, comprising the steps of:
   (a) comparing an input to a first reference voltage to thereby obtain a first difference therebetween;
   (b) comparing said input to a second reference voltage to thereby obtain a second difference therebetween;
   (c) calculating exclusive OR of said first and second differences;
   (d) carrying out flip-flop operation between said exclusive OR and said second difference;
   (e) selecting one of said first and second differences in accordance with a result of said step (d); and
   (f) carrying out second flip-flop operation between external clock and a difference selected in said step (e) between said first and second differences.

* * * * *

UNITED STATES PATENT AND TRADEMARK OFFICE
CERTIFICATE OF CORRECTION

PATENT NO. : 5,933,799
DATED : August 3, 1999
INVENTOR(S) : Hiroshi KAMIYA

It is certified that error appears in the above-identified patent and that said Letters Patent is hereby corrected as shown below:

Column 2, line 35, delete "referred" and insert --preferred--.

Signed and Sealed this

Twenty-eighth Day of March, 2000

Attest:

Q. TODD DICKINSON

*Attesting Officer*     *Commissioner of Patents and Trademarks*